(12) United States Patent
Hu

(10) Patent No.: US 10,545,607 B2
(45) Date of Patent: Jan. 28, 2020

(54) PIXEL CIRCUIT AND DRIVING METHOD, DISPLAY PANEL AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Zuquan Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 283 days.

(21) Appl. No.: 15/758,194

(22) PCT Filed: Aug. 14, 2015

(86) PCT No.: PCT/CN2015/087020
§ 371 (c)(1),
(2) Date: Mar. 7, 2018

(87) PCT Pub. No.: WO2016/095545
PCT Pub. Date: Jun. 23, 2016

(65) Prior Publication Data
US 2018/0246614 A1 Aug. 30, 2018

(30) Foreign Application Priority Data
Dec. 15, 2014 (CN) .......................... 2014 1 0777669

(51) Int. Cl.
*G06F 3/041* (2006.01)
*G06F 3/044* (2006.01)
*G09G 3/3258* (2016.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ...... G06F 3/0412; G06F 3/0416; G06F 3/042; G06F 3/044; G09G 2300/0852; G09G 2310/0262; G09G 3/3233; G09G 3/3258
See application file for complete search history.

(56) References Cited

U.S. PATENT DOCUMENTS

2008/0291125 A1* 11/2008 Yamashita ........... G09G 3/3233
345/55
2012/0061556 A1* 3/2012 Chan ................... G09G 3/3233
250/214 R
(Continued)

FOREIGN PATENT DOCUMENTS

CN         103325341 A     9/2013
CN         103354078 A     10/2013
(Continued)

OTHER PUBLICATIONS

International Search Report dated Aug. 14, 2015, issued in counterpart International Application No. PCT/CN2015/087020 (18 pages).

*Primary Examiner* — Hong Zhou
(74) *Attorney, Agent, or Firm* — Westerman, Hattori, Daniels & Adrian, LLP

(57) ABSTRACT

Provided is a pixel circuit. The pixel circuit includes a driving transistor (T1); a touch module (200) configured to cause a voltage change when a touch operation happens and coupled to a data line; and a writing compensation module (100) having a storage capacitor (C1) and a holding capacitor (Coled), configured to compensate a threshold voltage of the driving transistor (T1), and to allow the voltage change
(Continued)

to be read out through the data line by sharing at least one component with the touch module (200).

16 Claims, 3 Drawing Sheets

(52) U.S. Cl.
CPC ... *G09G 3/3258* (2013.01); *G09G 2300/0852* (2013.01); *G09G 2310/0262* (2013.01)

(56) References Cited

U.S. PATENT DOCUMENTS

| | | | |
|---|---|---|---|
| 2014/0055325 A1* | 2/2014 | Qi | G09G 3/3233 345/76 |
| 2014/0225838 A1 | 8/2014 | Gupta et al. | |
| 2015/0002414 A1* | 1/2015 | Tan | G06F 3/0412 345/173 |
| 2015/0103037 A1* | 4/2015 | Wu | G09G 3/3233 345/174 |
| 2015/0193045 A1* | 7/2015 | Zhou | G09G 3/3233 345/174 |
| 2015/0302801 A1* | 10/2015 | Tan | G06F 3/042 345/173 |

FOREIGN PATENT DOCUMENTS

| | | |
|---|---|---|
| CN | 203300192 U | 11/2013 |
| CN | 104392699 A | 3/2015 |
| CN | 204257176 U | 4/2015 |

\* cited by examiner

PIXEL CIRCUIT AND DRIVING METHOD, DISPLAY PANEL AND DISPLAY APPARATUS

CROSS-REFERENCES TO RELATED APPLICATIONS

This PCT application claims priority of Chinese Patent Application No. 201410777669.1, filed on Dec. 15, 2014, the entire contents of which are incorporated by reference herein.

FIELD OF THE INVENTION

The present invention generally relates to the field of organic light emitting diode apparatus and, more specifically, to pixel circuit and driving method, and related display panel and display apparatus.

BACKGROUND

With the development of display technologies, more and more active matrix organic light-emitting diode (AMOLED) displays have entered market. Comparing with the traditional thin-film transistor liquid crystal display (TFT LCD) panels, AMOLED display has faster response; higher contrast and wider viewing-angle, and therefore attracts more and more attentions of the manufactures.

Currently, touch operation has been more and more widely used. A touch screen is typically implemented by a resistive mode, a capacitive mode, an optical mode and an acoustic wave mode, etc. The touch screen implemented by the capacitive mode is referred as an in-cell capacitive touch screen. The touch sensor circuit of the in-cell capacitive touch screen is implemented inside the display panel. Thus, comparing with other touch modes, the display panel having the in-cell capacitive mode touch screen may be thinner, lighter, and the production cost may be lower. Therefore, the in-cell capacitive touch panel has received more and more attentions.

However, the pixel circuit of the OLED display already has a plurality of diodes for displaying. Thus, further integration of touch devices into the pixel circuit will increase the complexity of the pixel circuit, and reduce the aperture ratio of the display panel.

Therefore, according to the present disclosure, how to integrate touch devices into the pixel circuit of the OLED display has become an urgent technical issue in the field of display technology. The disclosed circuit, methods and apparatus are directed to at least partially solve one or more problems set forth above and other problems.

BRIEF SUMMARY OF THE DISCLOSURE

The present invention provides a pixel circuit and a driving method, a display panel including the disclosed pixel circuit, and a display apparatus of including the disclosed pixel circuit. The disclosed pixel circuit is integrated with touch elements, and has relatively large aperture ratio.

One aspect of the present disclosure includes a pixel circuit. The pixel circuit includes The pixel circuit includes a driving transistor; a touch module configured to cause a voltage change when a touch operation happens and coupled to a data line; and a writing compensation module having a storage capacitor and a holding capacitor, configured to compensate a threshold voltage of the driving transistor, and to allow the voltage change to be read out through the data line by sharing at least one component with the touch module.

Optionally, the writing compensation module includes a pulling-up sub-module for pulling up the voltage of a first terminal of the storage capacitor; a pulling-down sub-module for pulling down the voltage of a second terminal of the storage capacitor; and a storage capacitor and a holding capacitor for charging and discharging during a writing compensation stage.

Optionally, the pulling-up sub-module module further includes a first pulling-up switch transistor and a second pulling-up switch transistor; a first terminal of the first pulling-up switch transistor is connect to a reference voltage input terminal; a second terminal of the first pulling-up switch transistor is connected to a control gate of the driving transistor; a control gate of the of the first pulling-up switch transistor is connected to a first pulling-up control line; a first terminal of the second pulling-up switch transistor is connected to the second terminal of the first pulling up switch transistor; a second terminal of the of the second pulling-up switch transistor is connected to the first terminal of the storage capacitor; and a control gate of the second pulling-up switch transistor is connected to a second pulling-up control line.

Optionally, the pulling-down sub-module includes a pulling-down switch transistor; a first terminal of the pulling-down switch transistor is connected to a second terminal of the storage capacitor and a second terminal of the holding capacitor; a second terminal of the pulling-down switch transistor is connected to a turn-off voltage source; a control gate terminal of the pulling-down switch transistor is connected to a pulling-down control line.

Optionally, the driving transistor further includes a first terminal being connected to a driving voltage source for driving a light emitting module, and a second terminal being connected to a second terminal of the storage capacitor.

Optionally, the touch module includes a touch sensing element and a touch switch transistor; the touch switch transistor includes a first terminal being connected to a first terminal of the storage capacitor, a second terminal being connected to a first terminal of the touch sensing element, and a control gate terminal being connected to a touch sensing control line.

Optionally, the touch sensing element is a variable capacitor; and a second terminal of the variable capacitor is floating.

Optionally, the touch sensing element is a photosensitive diode; and a second terminal of the photosensitive diode is connected to a first grounding voltage source.

Optionally, the pixel circuit further includes a data connecting switch transistor; and the data connecting switch transistor includes a first terminal being connected to the data line, a second terminal being connected to a first terminal of the storage capacitor, and a control gate terminal being connected to a data connecting control line.

Optionally, the pixel circuit further includes a light emitting module comprising an organic light-emitting diode as a pixel of the pixel circuit; a first terminal of the organic light-emitting diode is connected to a second terminal of the storage capacitor; and a second terminal of the organic light-emitting diode is connected to a second grounding voltage source and a second terminal of the holding capacitor.

Another aspect of the present disclosure includes providing a driving method for the disclosed pixel circuit. The driving method includes implementing a touch stage including a first initialization sub-stage, a touch sensing sub-stage to sense a touch operation through the touch module, and a touch sensing readout sub-stage to allow the voltage change to be read out through the data line by sharing at least one component with the writing compensation module; and implementing a display stage including a second initialization sub-stage, a writing compensation sub-stage to compensate a threshold voltage of the driving transistor through the writing compensation module, and a light emitting sub-stage to display certain information.

Optionally, during the display stage, the touch module is disconnected from a storage capacitor. During the touch-sensing sub-stage, the touch module is connected with the storage capacitor; and the storage capacitor is conducted to a turn-off voltage.

Optionally, implementing the initialization sub-stage includes charging the storage capacitor to make voltage of a first terminal of the storage capacitor be equal to a pulling-up voltage, and voltage of a second terminal of the storage capacitor be equal to a turn off voltage.

Optionally, implementing the touch sensing sub-stage includes changing voltage on a first terminal of the storage capacitor by the touch module when a touch operation happens.

Optionally, the writing compensation sub-stage includes a signal writing sub-stage and a threshold voltage compensation sub-stage.

Optionally, implementing the writing compensation sub-stage includes writing a data voltage into the control gate of the driving transistor to turn on the driving transistor by the data line; and charging the storage capacitor and the holding capacitor until the voltage of a second terminal of the storage capacitor is equal to a deviation between the data voltage and the threshold voltage of the driving transistor.

Optionally, the light emitting sub-stage further includes emitting lights through the light emitting module driven by the driving transistor without disturbance of the threshold voltage.

Another aspect of the present disclosure includes providing a display panel. The display panel includes the disclosed pixel circuit.

Another aspect of the present disclosure includes providing a display apparatus. The display apparatus includes at least a disclosed display panel.

When the disclosed driving method is used to drive the disclosed pixel circuit, the storage capacitor is used as the storage capacitor for the touch module during the touch stage. Therefore, a storage capacitor is not necessarily included in the touch module, resulting in a relatively simple structure of the touch module. Thus, the disclosed pixel circuit has both a touch function and a higher aperture ratio.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

For illustrative purposes, the transistors described in the embodiments of the present disclosed may be thin-film transistors (TFTs), field-effect transistors, or other devices having similar electrical characteristics of transistors. The source and the drain of a transistor may be symmetrical. Thus, there may be no difference between the source and the drain of the transistor. In order to discriminate the source and the drain of the transistor, when one of the source and the drain of the transistor is referred as a first terminal, the other may be referred as a second terminal. The gate of the transistor may be referred as a control gate. Further, the transistors may be P-type transistors, or N-type transistors, according to the characteristics of the transistors. For illustrative purposes, in one embodiment, P-type thin-film transistors (dependent mode TFT) are used in the description; and the first terminal of a P-type transistor is the source; and the second terminal of the P-type transistor is the drain. In certain other embodiments, N-type transistors may be used.

Figure 1:
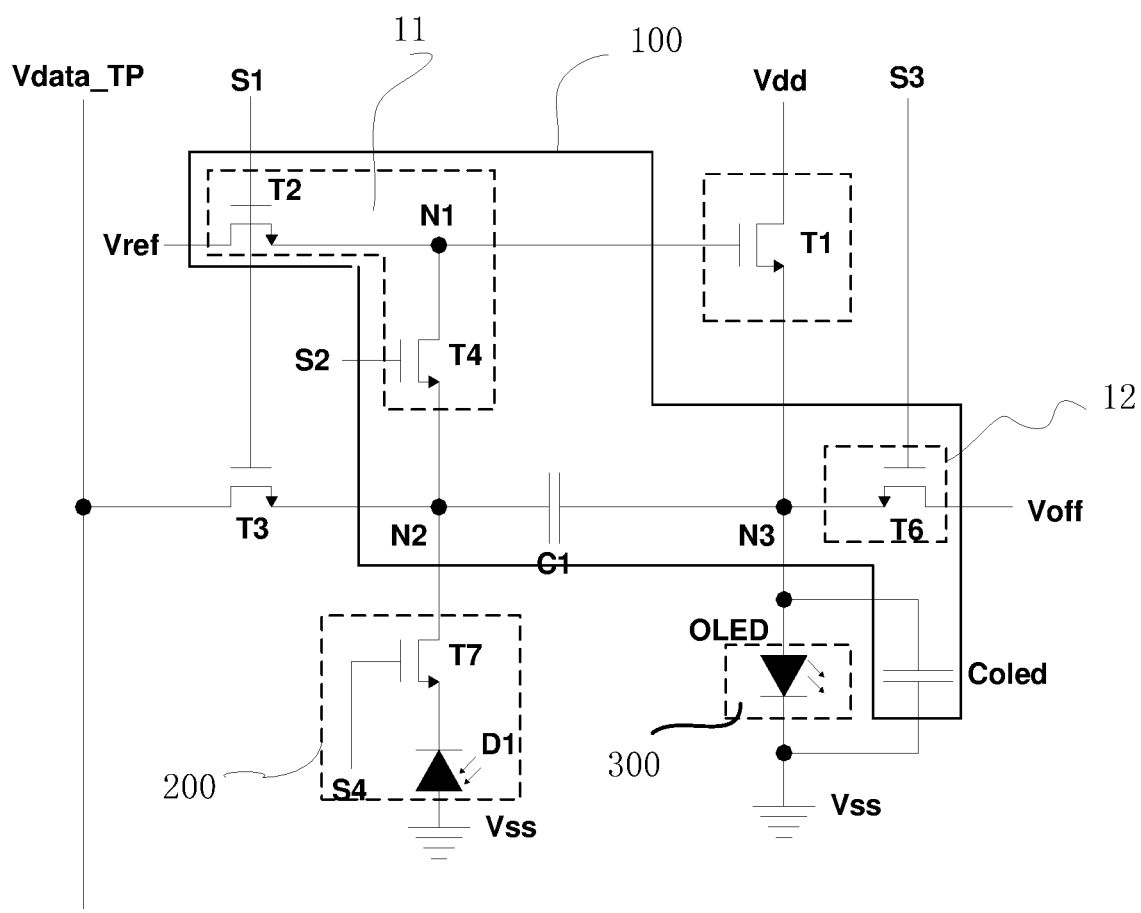
FIG. 1 illustrates a circuit diagram of an exemplary pixel circuit according to the disclosed embodiments.

FIG. 1 illustrates a circuit diagram of an exemplary pixel circuit according to the disclosed embodiments. As shown in FIG. 1, the pixel circuit may include a writing compensation module 100, a touch module 200 and a light emitting module 300. The pixel circuit may also include a turn-off voltage input terminal Voff, a data signal input terminal Vdata_TP, a data connecting transistor referred as a third thin-film transistor T3 and a driving transistor referred as a first thin-film transistor T1.

The writing compensation module 100 may include a pulling-up sub-module 11 for pulling up the voltage of a first terminal of the storage capacitor C1; a pulling-down sub-module 12 for pulling down the voltage of a second terminal of the storage capacitor C1; and a first terminal of the holding capacitor Coled.

The pulling-up sub-module 11 may include a first pulling-up transistor referred as a second thin-film transistor T2 and a second pulling-up transistor referred as a fourth thin-film transistor T4. The pulling-down sub-module 12 may include a pulling-down transistor referred as a six-thin film transistor T6.

Further, as shown in FIG. 1, a date connecting control line referred as a first scan signal input terminal S1 may be connected to a control gate of the second thin-film transistor T2 and the control gate of the third thin-film transistor T3. That is, the first scan signal input terminal S1 may be used to switch on or switch off the second thin-film transistor T2 and the third thin-film transistor T3. Thus, it may control the input of the data signal from the data signal input terminal Vdata_TP, and the input of the reference voltage from the reference voltage input terminal Vref. The data connecting control line S1 may also be used as a first pulling-up control line.

Further, as shown in FIG. 1, a second pulling-up control line referred as a second scan signal input terminal S2 may be connected to a control gate of the fourth thin-film transistor T4. Thus, the second scan signal input terminal S2 may be used to switch on or switch off the fourth thin-film transistor T4. The fourth thin-film transistor T4 may be connected between a first node "N1" and a second node "N2". Thus, the second scan signal input terminal S2 may control the connection and disconnection between the first node "N1" and the second node "N2".

Further, as shown in FIG. 1, a pulling down control line referred as a third signal input terminal S3 may be connected to a control gate the control gate of the sixth thin-film transistor T6. Thus, the third scan signal input terminal S3 may be used to switch on or switch off the sixth thin-film transistor T6.

Further, as shown in FIG. 1, the storage capacitor C1 may be connected to the second node "N2" and the third node "N3". A driving voltage source being equal to Vdd may be coupled to the third node "N3" by the first thin-film transistor T1. The turn-off voltage source being equal to Voff may be coupled to the third node "N3" by the sixth thin-film transistor T6.

Further, as shown in FIG. 1, in one embodiment, the touch module 200 may include a seventh thin-film transistor T7 and a photosensitive diode D1. In certain other embodiments, the touch module 200 may include any other appropriate devices. A touch sensing control line referred as a fourth scan signal input terminal S4 may be connected to the control gate of the seventh thin-film transistor T7; and may be used to switch on or switch off the seventh thin-film transistor T7. The photosensitive diode D1 may be connected to the seventh thin-film transistor T7 and a first grounding voltage source being equal to Vss.

Further, as shown in FIG. 1, in one embodiment, the OLED may be connected to the third node "N3" and a second grounding voltage source being equal to Vss. The holding capacitor Coled may be parallel connected with the OLED. That is, the holding capacitor Coled may also be connected to the third node "N3" and the grounding voltage source.

The writing compensation module 100 and the touch module 200 may be connected at the second node "N2". The first terminal of the storage capacitor C1 and the data signal input terminal Vdata_TP may be connected at the second node "N2"; and the electrical connection may be selectively switched on or switched off. The second terminal of the storage capacitor C1 and the turn-off voltage source may be connected at the third node "N3"; and the electrical connection may be selectively switched on or switched off. The cathode of the light-emitting diode OLED may be connected to the grounding voltage source. Further, the voltage provided by the grounding voltage source may be higher than the turn-off voltage inputted from the turn-off voltage source.

Figure 3:
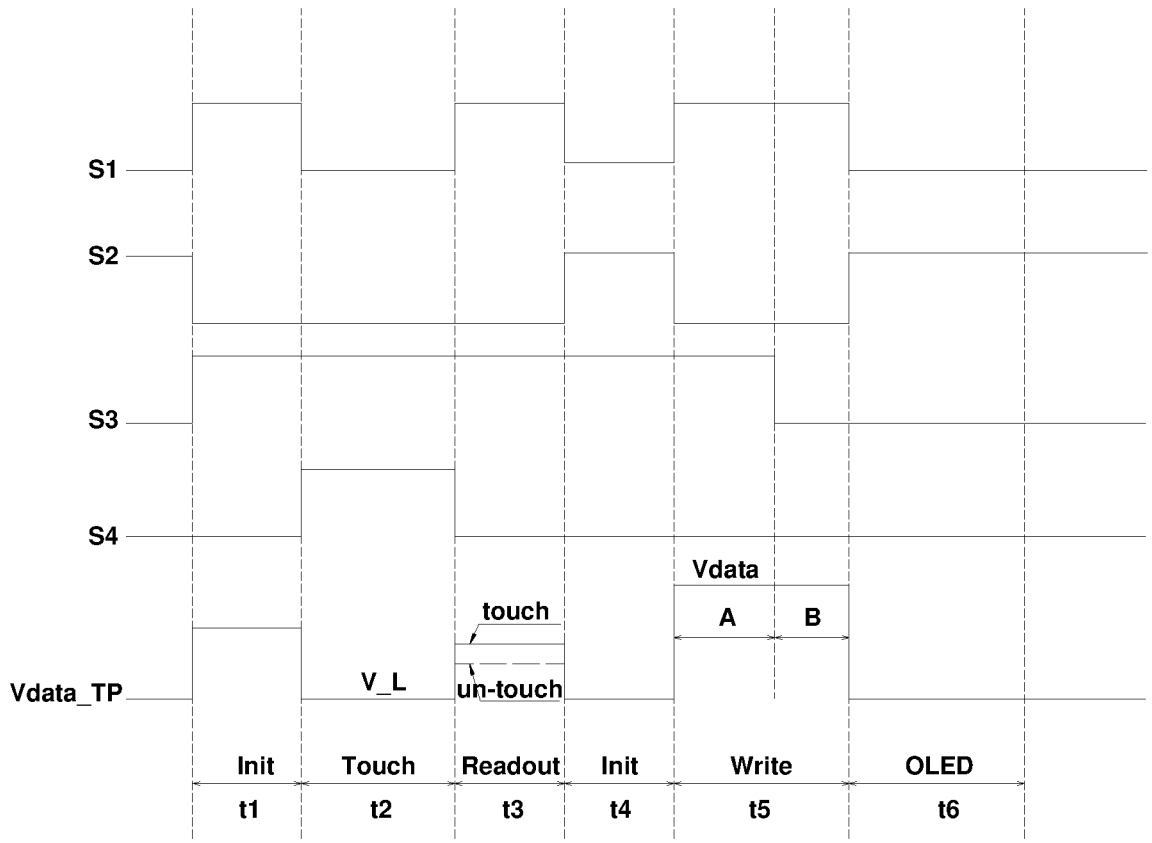
FIG. 3 illustrates a timing sequence of an exemplary pixel circuit according to the disclosed embodiments.

In an operation, the pixel circuit may be driven by various signals, and a pixel circuit driving method is provided. The pixel circuit driving method may include implementing a touch stage and a display stage, and corresponding sub-stages. Certain stages may be omitted and other stages may be added. FIG. 3 illustrates a timing sequence of the exemplary pixel circuit driving method according to the disclosed embodiments.

As shown in FIG. 3, the touch stage may include a first initialization sub-stage (t1), a touch sensing sub-stage (t2); and a touch sensing signal readout sub-stage (t3). The display stage may include a second initialization sub-stage (t4), a writing compensation sub-stage (t5); and a light-emitting sub-stage (OLED, t6).

During the touch stage (t1~t3 in FIG. 3), because the touch module 200 may be connected to the first terminal of the storage capacitor C1 the seventh thin-film transistor T7 is switched on during the touch-sensing sub-stage (t2); and the photosensitive diode D1 is connected to the second node "N2". Further, the second terminal of the storage capacitor C1 is conducted to the turn-off voltage source. That is, sixth thin-film transistor T6 is switched on; and the turn-off voltage source is connected to the third node "N3". Further, during the first initialization sub-stage (t1) and the touch sensing readout sub-stage (t3), the first terminal of the storage capacitor C1 is conducted to the data signal input terminal Vdata_TP. That is, the third thin-film transistor T3 is switched on. Further, during the touch sensing sub-stage (t2), the first terminal of the storage capacitor C1 is uncoupled from the data signal input Vdata_TP. That is, the third thin-film transistor T3 is switched off.

Further, referring to FIG. 1, during the first initialization sub-stage of the touch stage (t1 in FIG. 3), switch on signals may be provided on the first scan signal input terminal S1 and the third scan signal input terminal S3; and switch off signals may be applied on the second scan signal input terminal S2 and the fourth scan signal input terminal S4. Thus, the second thin-film transistor T2, the third thin-film transistor T3, and the sixth thin-film transistor T6 are switched on. Further, an initial voltage V0 may be applied on the data signal input terminal Vdata_TP. Thus, the voltage on the second node "N2" is V_N2=Vdata=V0. The initial voltage V0 may be higher than the turn-off voltage being equal to Voff inputted from the turn-off voltage source. Further, the voltage on the second terminal of the storage capacitor C1 on the third node "N3" is equal to the turn-off voltage Voff. That is V_N3=Voff. Further, the voltage on the control gate of the first thin-film transistor is Voff. Thus, the first thin-film transistor T1 is switched off. Because Voff<Vss, the OLED is off; and not emitting light. Thus, during the initialization sub-stage of the touch stage, the initial voltage V0 is written in the first terminal of the storage capacitor C1. Referring to FIG. 1, the V0 may also be configured as an initial voltage of the touch module 200.

Further, referring to FIG. 1, during the touch sensing sub-stage of the touch stage (t2 in FIG. 3), a switch on signal may be applied on the third scan signal input terminal S3 and the fourth scan signal input terminal S4; and switch off signals may be applied on the first scan signal input terminal S1 and the second scan signal input terminal S2. Thus, the second thin-film transistor T2, the third thin-film transistor T3, and the fourth thin-film transistor T4 are switched off; the sixth thin-film transistor T6 and the seventh thin-film transistor T7 are switched on. Thus, the first terminal of the storage capacitor C1 is directly connected to the touch module 200 at the second node "N2". When a touch operation occurs, the touch module 200 may generate a leakage current, thereby changing the potential of the first terminal of the storage capacitor C1. Because the storage capacitor C1 is not conducted to the data signal input terminal Vdata_TP, i.e., the third thin-film transistor T3 is switched off, the voltage change may be stored in the storage capacitor C1; and no discharge may occur.

Specifically, as mentioned previously, the touch module 200 may be a photosensitive touch module. As illustrated in FIG. 1, the touch module 200 includes a touch sensing element which is a photosensitive diode D1 and a touch switch transistor referred as a seventh thin-film transistor T7. The control gate of the seventh thin-film transistor T7 is connected to the fourth scan signal input terminal S4. The first terminal of the seventh thin-film transistor T7 may be connected to the first terminal of the storage capacitor C1 at the second node "N2". The second terminal of the seventh thin-film transistor T7 may be connected the cathode of the photosensitive diode D1, and the anode of the photodiode D1 may be connected to the second voltage input terminal Vss. Thus, when the seventh thin-film transistor T7 is switched on, the photosensitive diode D1 is directly coupled to the second node "N2".

The grounding voltage Vss is higher than the current voltage which is equal to V0 of the first terminal of the storage capacitor C1 during the touch sensing stage. Therefore, the photosensitive diode D1 may be at an "on" state. When an operator touches the display panel having such a pixel circuit, the photosensitive diode D1 may be blocked, i.e., light is blocked, leading to a change of the current passing through the photodiode D1. Thus, the voltage of the first terminal of the storage capacitor C1 on the second node "N2" may be correspondingly changed.

Figure 2:
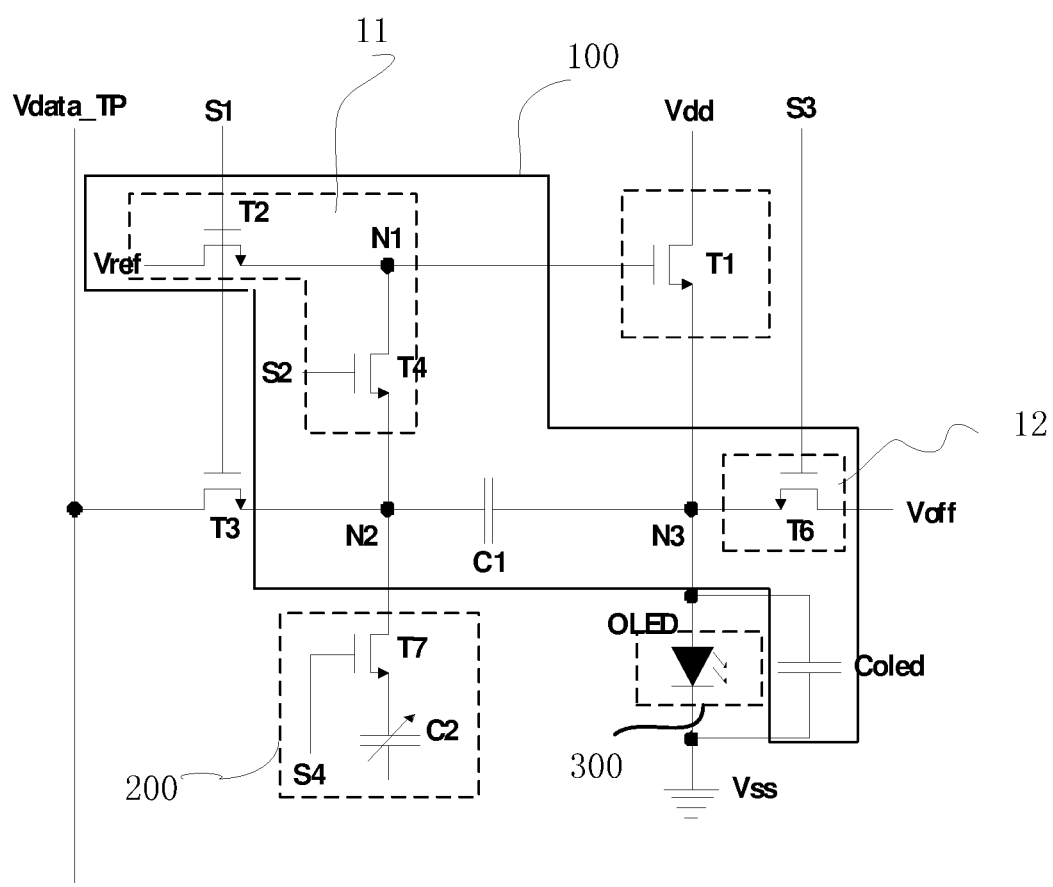
FIG. 2 illustrates a circuit diagram of another exemplary pixel circuit according to the disclosed embodiments.

In certain other embodiments, the touch module 200 may be a capacitive sensing module, and a circuit diagram of an exemplary pixel circuit is illustrated in FIG. 2. As illustrated in FIG. 2, the touch module 200 may include a touch sensing elements which is a variable capacitor C2 and a touch switch transistor referred as a seventh thin-film transistor T7. The control gate of the seventh thin-film transistor T7 may be connected to the fourth scan signal input terminal S4. The first terminal of the seventh thin-film transistor T7 may be connected to the first terminal of the storage capacitor C1. The second terminal of the seventh thin-film transistor T7 may be connected to the first terminal of the variable capacitor C2. The second terminal of the variable capacitor C2 may be floating or with a similar configuration. During the touch sensing stage, the seventh thin-film transistor T7 is switched on. Thus, the variable capacitor C2 is directly coupled to the second node "N2"

When an operator touches the display panel having such a pixel circuit, the capacitance of the variable capacitor C2 is changed; and leading to a change of the voltage of the first terminal of the storage capacitor C1 at the second node "N2".

Further, referring to FIG. 1, during the touch sensing readout sub-stage of the touch stage (t3 in FIG. 3), switch on signals may be provided on the first scan signal input terminal S1, the third scan signal input terminal S3; and switch off signals may be provided on the second scan signal input terminal S2 and the fourth scan signal input terminal S4. Thus, the second thin-film transistor T2, the third thin-film transistor T3, and the sixth thin-film transistor T6 are switched on; and the fourth thin-film transistor T4 and the seventh thin-film transistor T7 are switched off. Further, a switch off signal VGL, i.e., lower than the voltage on the second node "N2", is provided on the data signal input terminal Vdata_TP. Thus, the storage capacitor C1 may discharge to the data signal input terminal Vdata_TP.

When a touch operation occurs during the touch sensing sub-stage, the voltage across the storage capacitor C1 may be different from that without a touch operation. Thus, having a touch operation and not having a touch operation during the touch sensing sub-stage may result in different current intensities. According to the current intensity from the data signal input terminal Vdata_TP during the touch sensing sub-stage of the touch stage, the occurrence of a touch operation may be determined.

As illustrated in FIG. 3, if a touch operation occurs during the touch-sensing sub-stage, the signal output from the data signal input terminal Vdata_TP corresponds to the solid line where "touch" points at during the touch sensing readout sub-stage. If no touch operation occurs during the touch-sensing sub-stage, the signal output from the data signal input terminal Vdata_TP corresponds to the dashed line where "un-touch" points at during the touch sensing readout sub-stage.

Further, as shown in FIG. 1 and FIG. 3, the anode of the light emitting diode OLED is connected to the second terminal of the storage capacitor C1 at the third node "N3" while the cathode is connected to the grounding voltage source. Because signals are provided on the third second signal input terminal S3 during the entire touch stage (t1~t3 in FIG. 3), the sixth thin-film transistor T6 is always switched on. Thus, the voltage on the third node "N3" is the turn-off voltage Voff. The voltage of the grounding voltage source Vss may be higher than the turn-off voltage Voff. Thus, the light emitting diode OLED is reversely connected during the entire touch stage. That is, the OLED is at an "off" stage; and not emitting light.

According to the above description, the storage capacitor C1 may also be configured as the storage capacitor of the touch module 200 during the touch stage. Therefore, a storage capacitor may be unnecessarily included in the touch module 200, resulting in a relatively simple structure of the touch module 200. Thus, the pixel circuit provided in the present disclosure may have both a touch function and a relatively high aperture ratio.

Further, as shown in FIG. 1, in one embodiment, the writing compensation module 100 and the touch module 200 may share two switch transistors (i.e., the third thin-film transistor T3 and the sixth thin-film transistor T6), which may further simplify the structure of the pixel circuit, and the aperture ratio of the pixel circuit may be further increased.

In present disclosure, the specific structure of the writing compensation module 100 may not be limited, as long as it may share the storage capacitor C1, the third thin-film transistor T3 and the sixth thin-film transistor T6 with the touch module 200.

As an optional embodiment of the present disclosure, the writing compensation module 100 may have a compensation function. Specifically, as illustrated in FIG. 1 and FIG. 2, and described previously, the writing commenpensition module 100 the second scan signal input terminal S2, the first thin-film transistor T1, the second thin-film transistor T2, the fourth thin-film transistor T4, the sixth thin-film transistor, and the holding capacitor Coled.

The first terminal of the first thin-film transistor T1 is connected to the driving voltage source. The second terminal of the first thin-film transistor T1 is connected to the anode of the light emitting diode OLED. The driving voltage source may provide the driving voltage being equal to Vdd. The control gate of the second thin-film transistor T2 is connected to the first scan signal input terminal S1. The first terminal of the second thin-film transistor T2 is connected to a reference voltage source being equal to Vref. The second terminal of the second thin-film transistor T2 is connected to the control gate of the first thin-film transistor T1. The control gate of the third thin-film transistor T3 is connected to the first scan signal input terminal S1. The first terminal of the fourth thin-film transistor T4 is connected to the second terminal of the second thin-film transistor T2. The second terminal of the fourth thin-film transistor T4 is connected to the first terminal of the storage capacitor C1 at the second node "N2". The control gate of the fourth thin-film transistor T4 is connected the second scan signal input terminal S2.

Accordingly, the first terminal of the fourth thin-film transistor T4 is also connected to the control gate of the first thin-film transistor T1 while the second terminal of the fourth thin-film transistor T4 is also connected to the first terminal of the storage capacitor C1 at the second node "N2". The control gate of the sixth thin-film transistor T6 is connected to the third scan signal input terminal S3. The first terminal of the holding capacitor Coled is connected to the anode of the light emitting diode OLED. The second terminal of the holding capacitor Coled is connected to the cathode of the light emitting diode OLED.

The reference voltage Vref provided by the reference voltage input terminal, the turn-off voltage Voff provided by the turn-off voltage source, the driving voltage Vdd provided by the driving voltage source and the grounding voltage Vss provided by the grounding voltage source may satisfy the following relationship:

$$Vdd>Vss>Vref>Voff; \text{ and}$$

$$Vref>Voff+|Vth|, Vss>Vref+|Vth|.$$

It is readily understood that the first thin-film transistor T1 may be configured as a driving transistor in the writing compensation unit 100. When the writing compensation unit 100 has the structure as illustrated in FIG. 1 and FIG. 2, the display function and the compensation function may be both fulfilled. Further, it may be able to eliminate the influence of the threshold voltage of the first thin-film transistor T1 on the emission intensity of the light emitting diode OLED, and the emission uniformity of the OLED may be improved.

Referring to FIG. 3, the display stage may include a second initialization sub-stage (t4), a writing compensation sub-stage (t5); and a light emitting sub-stage (OLED, t6). Specifically, as shown in FIG. 1 and FIG. 3, during the second initialization sub-stage of the display stage (t4 in FIG. 3), switch on signals may be provided on the second scan signal input terminal S2 and the third scan signal input terminal S3; and switch off signals may be provided on the first scan signal input terminal S1, and the fourth scan signal input terminal S4. Thus, the fourth thin-film transistor T4, and the sixth thin-film transistor T6 are switched on; and the second thin-film transistor T2, the third thin-film transistor T3 and the seventh thin film transistor T7 are switched off. Thus, the voltage on the second node "N2" and the voltage on the third node "N3" are same.

As a result of the initialization, the voltage difference across the storage capacitor C1 is 0. In addition, the voltage of the second terminal of the storage capacitor C1 at the third node "N3" may be equal to the turn-off voltage Voff; and Voff may be smaller than Vss. Therefore, the OLED is reversely connected, and in a non-emitting state. Meanwhile, the gate voltage of the first thin-film transistor T1 is the turn-off voltage Voff. Therefore, the first thin-film transistor T1 is switched off.

Further, as shown in FIG. 1 and FIG. 3, the writing compensation sub-stage of the display stage (t5 in FIG. 3) may include a signal writing sub-stage "A" and a threshold voltage compensation sub-stage "B". During these two sub-stages, a data voltage "Vdata" may be provided via the data signal input terminal Vdata_TP.

During the signal writing sub-stage "A", switch on signals may be provided on the first scan signal input terminal S1 and the third scan signal input terminal S3; and switch off signals may be provided on the second scan signal input terminal S2 and the fourth scan signal input terminal S4. Thus, the second thin-film transistor T2, the third thin-film transistor T3, and the sixth thin-film transistor T6 are switched on; and the fourth thin-film transistor T4 and the seventh thin-film transistor T7 are switched off. The data voltage Vdata may be written to the first terminal of the storage capacitor C1; and the turn-off voltage Voff may be written to the first terminal of the storage capacitor C1. That is, V_N2=Vdata; and V_N3=Voff. The gate voltage of the first thin-film transistor T1 may be the reference voltage Vref. Because of the turning on of the sixth thin-film transistor, the voltage of the third node is equal to the turn-off voltage Voff. Further, the touch module 200 is uncoupled from the writing compensation module 100.

During the threshold voltage compensation sub-phase "B", the switch on signal is continuously provided on the first scan signal input terminal S1. Therefore, the second thin-film transistor T2 and the third thin-film transistor T3 are still switched on; and the voltage on the first terminal of the storage capacitor C1 may be maintained as the data voltage Vdata. That is, V_N2=Vdata. While a turning off signal may be provided on the third scan signal input terminal S3. Therefore, the sixth thin-film transistor T6 is switched off.

Under such a condition, the reference voltage Vref may be written to the control gate of the first thin-film transistor T1. As already known that the voltage of the second terminal of the storage capacitor C1 may be equal to the turn-off voltage Voff, and currently, the gate-source voltage of the first thin-film transistor T1 is Vref-Voff>|Vth|. Thus, the first thin-film transistor T1 may be switched on. The storage capacitor C1 and the holding capacitor Coled may be kept charging until the voltage of the third node reaches Vref-Vth. That is, V_N3=Vref-Vth. Because the grounding voltage Vss may be higher than the sum of the reference voltage Vref and the absolute value of the threshold voltage Vth of the first thin-film transistor T1, the light emitting diode OLED is reversely connected, and at a non-emitting state. The voltage difference across the storage capacitor C1 may be Vdata-(Vref-Vth)=Vdata-Vref+Vth. Thus, the start of the threshold voltage compensation on the first thin-film transistor T1 in this stage may be independent of the positive or negative value of the threshold voltage Vth.

Further, as shown in FIG. 1 and FIG. 3, during the light emitting sub-stage of the display stage (t6 in FIG. 3), a switch on signal may be provided on the second scan signal input terminal S2. Thus, the fourth thin-film transistor T4 is switched on. Switch off signals may be provided on the first scan signal input terminal S1, the third scan signal input terminal S3 and the fourth scan signal input terminal S4. Thus, the second thin-film transistor T2, the third thin-film transistor T3, the sixth thin-film transistor T6 and the seventh thin-film transistor T7 are switched off. The voltage on the first terminal of the storage capacitor C1 is written to the control gate of the first thin-film transistor T1. Thus, the first thin-film transistor T1 is switched on. The gate-source voltage of the first thin-film transistor T1 may be maintained as Vdata-Vref+Vth; and may be greater than Vth. Also, because the value of the voltage by subtracting the threshold voltage Vth of the first thin-film transistor T1 from its gate-source voltage is not greater than its drain-source voltage Vds, i.e., Vgs−Vth≤Vds, the first thin-film transistor T1 may operates at a saturation switch on state. Thus, the following equation may be used to calculate the turn-on current of the OLED.

$$I=K(Vgs-Vth)2=K(Vdata-Vref+Vth-Vth)^2=K(Vdata-Vref)^2$$

Wherein, K is a constant relevant to the process parameters and dimensions of the first thin-film transistor T1.

The above equation may indicate that the turn-on current of the light emitting OLED may be independent of the threshold voltage Vth of the first thin-film transistor T1. Thus, the influence of the threshold voltage of the first thin-film transistor T1 to the brightness of the OLED may be eliminated. Thus, the emission uniformity of the OLED may be improved.

Further, referring to FIG. 3, during the display stage (t4~t6), switch off signals may be always provided on the fourth scan signal input terminal S4. Thus, the seventh thin-film transistor T7 is switched off. The touch module 200 is uncoupled from the first terminal of the storage capacitor C1. Thus, the touch module 200 may not play a role during the display stage.

Therefore, the present disclosure includes providing a pixel circuit driving method. Specifically, the pixel circuit is the one provided in the present disclosure; and the driving method may include a plurality of display periods. Each of the display periods may include the touch stage and the display stage.

The pixel driving method includes disconnecting the touch module from the storage capacitor during the display stage; and conducting the touch module to the storage capacitor and conducting the second terminal of the storage capacitor to the turn-off voltage input the second terminal during the touch-sensing readout sub-stage.

During the first initialization sub-stage of the touch stage, the initial voltage V0 may be provided on the data signal input terminal; and the first terminal of the storage capacitor may be conducted to the data signal input terminal.

During the touch sensing sub-stage of the touch stage, the first terminal of the storage capacitor may be disconnected from the data signal input terminal.

During the touch sensing readout sub-stage of the touch stage, the first terminal of the storage capacitor may be conducted to the data signal input terminal and a switch off signal may be provided on the data signal input terminal.

When the pixel driving method described above is used, both the display function and the touch function could be fulfilled.

For better control, optionally, the writing compensation module may include a third thin-film transistor and a sixth thin-film transistor. The first terminal of the third thin-film transistor is connected to the data signal input terminal; the second terminal of the third thin-film transistor is connected to the first terminal of the storage capacitor; the first terminal of the sixth thin-film transistor may be connected to the first terminal of the storage capacitor; and the second terminal of the sixth thin-film transistor may be connected to the turn-off voltage input terminal.

During the touch stage, the sixth thin-film transistor may be switched on. During the first initialization sub-stage and the touch sensing readout sub-stage of the touch stage, the third thin-film transistor may be switched on. During the touch sensing sub-stage of the touch stage, the third thin-film transistor may be switched off.

In order to better turn on or turn of the third thin-film transistor and the sixth thin-film transistor, optionally, the pixel circuit may include a first scan signal input terminal and a third scan signal input terminal. The first scan signal input terminal may be connected the control gate of the third thin-film transistor, and the third scan signal input terminal may be connected to the control gate of the sixth thin-film transistor.

During the touch stage, a switch on signal may be inputted to the third scan signal input terminal. During the first initialization and the touch sensing readout sub-stages of the touch stage, a switch on signal may be input to the first scan signal input terminal. During the touch sensing sub-stage of the touch stage, a switch off signal may be provided to the first scan signal input terminal.

As described above, the touch module may be a photo-sensitive touch module. In such an embodiment, the touch module may include a photosensitive diode and a seventh thin-film transistor. The control gate of the seventh thin-film transistor may be connected the fourth scan signal input terminal; the first terminal of the seventh thin-film transistor may be connected to the first terminal of the storage capacitor; the second terminal of the seventh thin-film transistor may be connected to the cathode of the photodiode; and the anode of the photodiode may be connected to the second voltage input terminal.

The touch module may also be a capacitive touch module. In such an embodiment, the touch module may include a variable capacitor and a seventh thin-film transistor. The control gate of the seventh thin-film transistor may be connected to the fourth scan signal input terminal; the first terminal of the seventh thin-film transistor may be connected the first terminal of the storage capacitor; and the second terminal of the seventh thin-film transistor may be connected to the variable capacitor. The second terminal of the variable capacitor is floating or with similar configuration.

To cause the pixel circuit to have the compensation function and the touch sensing function, optionally, the pixel circuit may have a 6T2C structure as shown in FIG. 1 and FIG. 2. That is, the pixel circuit may include 6 transistors and 2 capacitors. Specifically, the pixel circuit may include a driving voltage source, a second scan signal input terminal, a first thin-film transistor, a second thin-film transistor, a third thin-film transistor, a fourth thin-film transistor, a sixth thin film transistor, a storage capacitor and a holding capacitor.

The first terminal of the first thin-film transistor may be connected to the driving voltage source; the second terminal of the first thin-film transistor may be connected to the anode of the photodiode; the control gate of the second thin-film transistor may be connected to the first scan signal input terminal; the first terminal of the second thin-film transistor may be connected to the reference voltage input terminal; the second terminal of the second thin-film transistor may be connected to the control gate of the first thin-film transistor; the control gate of the third thin-film transistor may be connected to the first scan signal input terminal; the first terminal of the fourth thin-film transistor may be connected to the second terminal of the second thin-film transistor; the second terminal of the fourth thin-film transistor may be connected the first terminal of the storage capacitor; the gate of the fourth thin-film transistor may be connected to the second scan signal input terminal the control gate of the sixth thin-film transistor may be connected to the third scan signal input terminal; the first terminal of the holding capacitor may be connected to the anode of the photodiode; the second terminal of the holding capacitor may be connected or coupled to the cathode of the photodiode.

When the pixel circuit has the disclosed structure, the display stage may include following steps.

During the data writing sub-stage, a switch on signal may be provided on the first scan signal input terminal. During the initialization and light emitting sub-stages, a switch on signal may be provided on the second scan signal input terminal. During the data writing sub-stage, a switch on signal may be provided on the third scan signal input terminal. During the entire display stage, switch off signals may always be provided on the fourth scan signal input terminal.

Further, according to the disclosed embodiments, a display panel is provided. Specifically, the display panel may include the pixel circuit provided in the present disclosure. It may be easy to understand that the display panel is an organic light emitting diode display panel (OLED display panel).

Because the touch module and the writing compensation module may at least share the storage capacitor, the pixel circuit provided by the present disclosure may have a simple structure, and may have advantages of a high aperture ratio, and being able to be touch controlled.

It may be easy to understand that, in the display panel provided in the present disclosure, the first voltage input terminal, the second voltage input terminal, the reference voltage input terminal and the turn-off voltage input terminal may all be connected or coupled to a DC power supply which provides the corresponding voltage signals. The data signal input terminals may be connected or coupled to a data cable. The first scan signal input terminal, the second signal input terminal, the third scan signal input terminal and the fourth scan signal input terminal may be all connected or coupled to corresponding scan lines.

Figure 4:
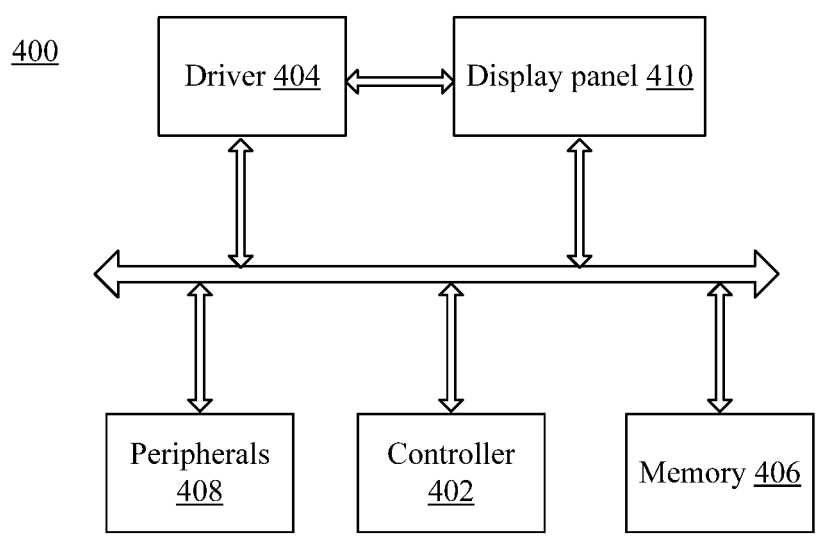
FIG. 4 illustrates a block diagram of an exemplary display apparatus according to the disclosed embodiments.

Further, according to the disclosed embodiments, a display apparatus is provided. FIG. 4 illustrate an exemplary display apparatus incorporating the disclosed display pixel circuits; and other aspects of the present disclosure. The display apparatus 400 may be any appropriate device or component with certain display function, such as a TV, a monitor, a cell phone or smartphone, a computer, a notebook computer, a tablet, a digital photo-frame, or a navigation system, etc.

As shown in FIG. 4, the display apparatus 400 includes a controller 402, a driver circuitry 404, a memory 406, peripherals 408, and a display panel 410. Certain devices may be omitted and other devices may be included.

The controller 402 may include any appropriate processor or processors, such as a general-purpose microprocessor, digital signal processor, and/or graphic processor. Further, the controller 402 can include multiple cores for multi-thread or parallel processing. The memory 406 may include any appropriate memory modules, such as read-only memory (ROM), random access memory (RAM), flash memory modules, and erasable and rewritable memory, and other storage media such as CD-ROM, U-disk, and hard disk, etc. The memory 406 may store computer programs for implementing various processes, when executed by the controller 402.

Peripherals 408 may include any interface devices for providing various signal interfaces, such as USB, HDMI, VGA, DVI, etc. Further, peripherals 408 may include any input and output (I/O) devices, such as keyboard, mouse, and/or remote controller devices. Peripherals 408 may also include any appropriate communication module for establishing connections through wired or wireless communication networks The driver circuitry 404 may include any appropriate driving circuit to drive the display panel 410. The display panel 410 may include may include any appropriate flat panel display, such as an LCD panel, an LED-LCD panel, a plasma panel, or an OLED panel, etc. In certain embodiments, the display panel 410 may include an AMOLED panel with the disclosed pixel circuits. During operation, the display 410 may be provided with image signals by the controller 402 and the driver circuitry 404 for display. Because the display apparatus includes the disclosed array substrate, the display effect may be improved. The display apparatus may have the functions in-cell touch and the threshold voltage compensation; and the display effect may be improved.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A pixel circuit, comprising:
a driving transistor;
a touch module configured to cause a voltage change when a touch operation happens and coupled to a data line; and
a writing compensation module having a storage capacitor and a holding capacitor, configured to compensate a threshold voltage of the driving transistor, and to allow the voltage change to be read out through the data line by sharing at least one component with the touch module,
wherein the writing compensation module includes:
a pulling-up sub-module for pulling up the voltage of a first terminal of the storage capacitor;
a pulling-down sub-module for pulling down the voltage of a second terminal of the storage capacitor; and
a storage capacitor and a holding capacitor for charging and discharging during a writing compensation stage, wherein:
the pulling-up sub-module further includes a first pulling-up switch transistor and a second pulling-up switch transistor;
a first terminal of the first pulling-up switch transistor is connect to a reference voltage input terminal;
a second terminal of the first pulling-up switch transistor is connected to a control gate of the driving transistor;
a control gate of the of the first pulling-up switch transistor is connected to a first pulling-up control line;
a first terminal of the second pulling-up switch transistor is connected to the second terminal of the first pulling-up switch transistor;
a second terminal of the of the second pulling-up switch transistor is connected to the first terminal of the storage capacitor; and
a control gate of the second pulling-up switch transistor is connected to a second pulling-up control line, and
wherein:
the pulling-down sub-module includes a pulling-down switch transistor;
a first terminal of the pulling-down switch transistor is connected to a second terminal of the storage capacitor and a first terminal of the holding capacitor;
a second terminal of the pulling-down switch transistor is connected to a turn-off voltage source; and
a control gate terminal of the pulling-down switch transistor is connected to a pulling-down control line.

2. The pixel circuit according to claim 1, wherein:
the driving transistor further includes a first terminal being connected to a driving voltage source for driving a light emitting module, and a second terminal being connected to a second terminal of the storage capacitor.

3. The pixel circuit according to claim 1, wherein:
the touch module includes a touch sensing element and a touch switch transistor;
the touch switch transistor includes a first terminal being connected to a first terminal of the storage capacitor, a second terminal being connected to a first terminal of the touch sensing element, and a control gate terminal being connected to a touch sensing control line.

4. The pixel circuit according to claim 3, wherein:
the touch sensing element is a variable capacitor; and
a second terminal of the variable capacitor is floating.

5. The pixel circuit according to claim 3, wherein:
the touch sensing element is a photosensitive diode; and
a second terminal of the photosensitive diode is connected to a first grounding voltage source.

6. The pixel circuit according to claim 1, wherein:
the pixel circuit further includes a data connecting switch transistor; and
the data connecting switch transistor includes a first terminal being connected to the data line, a second terminal being connected to a first terminal of the storage capacitor, and a control gate terminal being connected to a data connecting control line.

7. The pixel circuit according to claim 1, wherein:
the pixel circuit further includes a light emitting module comprising an organic light-emitting diode as a pixel of the pixel circuit;
a first terminal of the organic light-emitting diode is connected to a second terminal of the storage capacitor;
a second terminal of the organic light-emitting diode is connected to a second grounding voltage source and a second terminal of the holding capacitor.

8. A pixel circuit driving method for a pixel circuit according to claim 1, comprising:
implementing a touch stage including a first initialization sub-stage, a touch sensing sub-stage to sense a touch operation through the touch module, and a touch sensing readout sub-stage to allow the voltage change to be read out through the data line by sharing at least one component with the writing compensation module; and
implementing a display stage including a second initialization sub-stage, a writing compensation sub-stage to compensate a threshold voltage of the driving transistor through the writing compensation module, and a light emitting sub-stage to display certain information.

9. The pixel circuit driving method according to claim 8, further including:
disconnecting the touch module from a storage capacitor of the writing compensation module during the display stage;
connecting the touch module with the storage capacitor of the writing compensation module during a touch-sensing sub-stage; and
conducting the storage capacitor to a turn-off voltage source during the touch stage.

10. The pixel circuit driving method according to claim 8, wherein:
implementing the initialization sub-stage includes charging the storage capacitor to make voltage of a first terminal of the storage capacitor be equal to a pulling-up voltage, and voltage of a second terminal of the storage capacitor be equal to a turn off voltage.

11. The pixel circuit driving method according to claim 8, wherein:
implementing the touch sensing sub-stage includes changing voltage on a first terminal of the storage capacitor by the touch module when a touch operation happens.

12. The pixel circuit driving method according to claim 8, wherein:
the writing compensation sub-stage includes a signal writing sub-stage and a threshold voltage compensation sub-stage.

13. The pixel circuit driving method according to claim 12, wherein,
implementing the writing compensation sub-stage includes writing a data voltage into the control gate of the driving transistor to turn on the driving transistor by the data line; and charging the storage capacitor and the holding capacitor until the voltage of a second terminal of the storage capacitor is equal to a deviation between the data voltage and the threshold voltage of the driving transistor.

14. The pixel circuit driving method according to claim 8, wherein during the light emitting sub-stage, further including:
emitting lights through the light emitting module driven by the driving transistor without disturbance of the threshold voltage.

15. A display panel comprising at least a pixel circuit according to claim 1.

16. A display apparatus comprising at least a display panel according to claim 15.

* * * * *